United States Patent Office

2,766,214
Patented Oct. 9, 1956

2,766,214

EMULSIFIABLE POLYETHYLENE WAXES AND PREPARATION THEREOF

Michael Erchak, Jr., Morris Township, Morris County, and Robert J. Blazek, Morris Plains, N. J., assignors to Allied Chemical & Dye Corporation, New York, N. Y., a corporation of New York No Drawing. Application October 22, 1953, Serial No. 387,778

20 Claims. (Cl. 260—29.6)

This invention relates to polyethylene waxes and more particularly to water-insoluble polyethylene waxes which are readily emulsifiable in aqueous media, to a process for preparing such modified waxes and to aqueous emulsions prepared therefrom.

Water-insoluble polyethylene wax materials have been prepared in the past by polymerizing ethylene at relatively low temperatures and pressures in the presence of modifying agents such as organic liquids, including alcohols, etc., to form waxy polymers having molecular weights below about 6,000. Many of such waxes, particularly those having desirable high hardness and high melting point characteristics such as suggest their utility as substitutes for the harder natural waxes such as carnauba wax, have been found to resist emulsification in aqueous media, and thus to be unadapted for the many emulsion uses served by carnauba wax, for example in emulsion floor polishes, latex paints, paper and textile treating and the like.

It is an object of the present invention to provide a readily emulsifiable polyethylene type wax.

It is a further object of the invention to provide readily emulsifiable water-insoluble wax of good color and high hardness characteristics.

It is a further object of the invention to provide a process for improving the emulsifiability of certain polyethylene type waxes.

It is a still further object of the invention to provide stable aqueous emulsions containing polyethylene type waxes.

These and other objects are accomplished according to our invention wherein polyethylene waxes which contain in their structures at least one alcohol, ester, or halogen group, or a double bond resulting from dehydration of an alcohol group, are reacted with a small quantity of an unsaturated aliphatic polycarboxylic acid having from 4 to 6 carbon atoms inclusive, and which has at least one active carbonyl group attached to a doubly bound carbon atom, or an anhydride of such of the above acids as form anhydrides. Whenever, in the specification and claims which follow, the term "acid" is used, it is to be understood to include the anhydrides of such of the acids as form anhydrides.

While the exact nature of the reaction between the unsaturated acid and the polyethylene type wax of the character defined, is not entirely clear, it is believed that the double bond of the unsaturated acid adds to the waxy polymer chain at the point of the particular active group of the polymer.

One group of polyethylene waxes which can be treated according to our invention to improve their emulsifiability comprises the polyethylene/alcohol telomers. By the expression "polyethylene/alcohol telomers" is meant polyethylene waxes prepared by polymerizing ethylene under wax forming conditions in the presence of a liquid aliphatic alcohol having from 1 to 10 carbon atoms inclusive, preferably isopropanol, and which consequently contain the corresponding alcohol groups in their structures. For example, when ethylene is polymerized in the vapor phase in the presence of isopropanol vapor at pressures between 100 and 1,000 atmospheres and temperatures within the range 100° C. to 300° C. the structure of the resulting waxes may be written

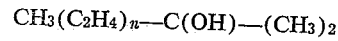

$$CH_3(C_2H_4)_n-C(OH)-(CH_3)_2$$

where $n$ is an integer, and the waxes are a mixture of individual homologs having varying values for $n$. In such waxes the values for $n$ are substantially entirely in the range of about 30 to about 150. The product has an average molecular weight in the range between about 1,500 and about 3,000, solidification point in the range above 95° C. and below 110° C., and hardness measured by penetration in 5 seconds of a standard ASTM needle under 200 grams load at 22° C. in the range between about 0.1 mm. and about 0.5 mm. Melt viscosities of the products are from about 125 to 700 centipoises at 250° F. 45–300 centipoises at 300° F., and 25–200 centipoises at 350° F. Waxes of this character are the preferred starting waxes for treatment according to our invention. When such polyethylene/alcohol telomers are reacted with the unsaturated acid, vigorous reaction takes place, producing resulting wax products of good emulsifiability. If a polyethylene/alcohol telomer of the character described above is dehydrated, resulting in elimination of the OH radical and one hydrogen from adjoining carbon atoms, and formation of a double bond, the resulting waxes may also be reacted with unsaturated acids as defined, to produce waxes of good emulsifiability.

Another group of polyethylene waxes which respond to treatment according to our invention are the ethylene polymers containing at least one ester group. Such waxes are prepared either by polymerizing ethylene in the presence of liquid esters to form ethylene/ester telomers as in the case of the alcohols, or they may consist of copolymers of ethylene with ester-containing polymerizable unsaturated compounds such as diethyl and dihexyl maleate and vinyl acetate. If such copolymers are prepared in the presence of a lower aliphatic alcohol such as isopropanol, so that they also contain an OH group, they react even more readily with the unsaturated acid so that the reaction may be carried out at a lower temperature than used with waxes formed by copolymerization in the absence of such alcohol. Thus, copolymers of ethylene with diethyl and dihexyl maleate and with vinyl acetate react readily with maleic anhydride at about 200° C. to form products which emulsify readily. Vinyl acetate/ethylene telomers prepared in the presence of isopropanol react readily with maleic anhydride at temperatures as low as 190° C. to produce readily emulsifiable modified waxes.

Polyethylene waxes containing at least one halogen group in their structures also react vigorously with the unsaturated acids as defined to produce modified waxes which are readily emulsifiable in aqueous media. Halogenated polyethylene type waxes may be prepared in any suitable manner, such as by direct halogenation of the polyethylene wax, by polymerizing ethylene in the presence of a chlorinated organic liquid such as carbon tetrachloride, ethyl chloride, allyl chloride, etc. When such halogen-containing polyethylene waxes are reacted with the unsaturated acid, hydrogen halide is usually evolved. The quantity of unsaturated acid absorbed increases directly with the chlorine content of the wax.

The preferred molecular weights of the starting waxes are less than about 6,000 and molecular weights in the range between about 1,000 and about 3,000 are especially satisfactory.

Illustrative of the polycarboxylic acids which are reacted with the polyethylene type waxes as defined, to improve their emulsifiability, are maleic, fumaric, mesaconic, citraconic, glutaconic, itaconic, muconic and aconitic acids. Because of their ready availability and also their superior thermal stability, we prefer to use maleic acid and its anhydride and fumaric acid.

In carrying out the process according to our invention, the polyethylene wax material to be treated is heated with at least about 2%, preferably between about 2% and about 6% of the unsaturated acid, at temperatures between about 175° C. and about 300° C.

The quantity of unsaturated acid necessary to insure a modified product of good emulsifiability is extremely small. A quantity as low as about 2% by weight based on the weight of the reaction mass results in an appreciable improvement in emulsifiability. Quantities between about 3% and about 6% result in products of excellent emulsifiability, and quantities up to about 8% or higher may be used, but in such cases, the product tends to become somewhat discolored without showing additional improvement in ease of emulsifiability and at the higher percentages, considerable quantities of unreacted unsaturated acid remain in the finished wax product. Accordingly, we prefer to use quantities of unsaturated acid in the range between about 3% and about 6% by weight based on the weight of the wax-acid charge.

The reaction proceeds rapidly, and, initially, ease of emulsification increases as the reaction time increases. At 230° C. improvement in emulsifiability of the treated wax begins to be noticeable in a heating time of about 30 minutes and usually is completed in about 40 minutes to about 2 hours. At 275-300° C. shorter heating times may be used, e. g. 10 to 20 minutes. Longer heating times may be used but tend to darken and discolor the resulting modified wax product. Accordingly, heating times between about 10 minutes and about 2 hours are preferred with the short periods applicable to the higher temperatures and vice versa.

Temperature of heating is important, and a temperature of at least about 175° C. is required for initiation of appreciable reaction. Temperatures above about 275° C. on the other hand, while producing readily emulsifiable waxes tend to discolor the product and to reduce its hardness. In batch operations we prefer to carry out the reaction at temperatures between about 190° C. and about 275° C. for best results in short times, optimum temperatures in the case of maleic acid and anhydride being between about 225° C. and about 250° C. and in the case of fumaric acid being between about 250° C. and about 275° C.

The properties of the resulting waxes are generally similar to those of the original waxes except for their improved emulsifiability. The hardness of the resulting wax depends on the hardness of the original wax before treatment. Usually the treatment with unsaturated acid as described, tends to make the modified product only slightly softer than the original product. In general, loss of hardness by the treatment according to our invention does not exceed about 0.10 mm. in terms of penetration determined by the Krebs penetrometer which involves measuring the penetration distance of a standard ASTM needle into the sample in 5 seconds under a load of 200 grams at about 22 C. Color is only slightly darkened and usually ranges from light yellow to tan. Of the modified waxes prepared by reaction of maleic acid or anhydride with ethylene/isopropanol telomer wax, the preferred products, such as those prepared as described in Examples 7, 12, 15 and 16 below have ester numbers approaching zero, acid numbers between about 20 and about 60 and oxygen contents between about 1% and about 3%.

The reaction between the wax and unsaturated acid may be carried out either batchwise or continuously. In operating continuously, the mixture may be passed through a heated reaction tube or column at a rate effective to produce the desired degree of reaction.

The modified waxes of our invention show marked improvement in emulsifiability over that of the starting waxes. In most cases they emulsify readily in aqueous media when processed according to conventional emulsification techniques, with the aid of the usual emulsifying agents, including triethanolamine and morpholine used in conjunction with fatty acids such as oleic and stearic, the higher alkyl sodium sulfates and sulfonates; higher alkyl aromatic sodium sulfonates; fatty soaps; non-ionic types, e. g. reaction products of higher alcohols with ethylene oxide; salts of sulfonated and sulfated amides; and the like. In this respect many of the modified waxes are comparable in emulsifiability to the best of the natural hard waxes including carnauba wax. On drying, the emulsions prepared from our modified waxes deposit transparent films of high tenacity to the surfaces to which they are applied, and exhibit especially good adhesion to metals.

The following specific examples will further illustrate our invention.

EXAMPLES 1–14

*Preparation of modified waxes using maleic anhydride*

In carrying out the preparations detailed below, a closed reactor provided with gas inlet and outlet, stirrer, and thermometer, was charged with an ethylene/isopropanol wax prepared by polymerizing ethylene in the vapor phase in the presence of isopropanol vapor at temperatures between about 100° C. and about 300° C. and pressures between 100 and 700 atmospheres. The wax was heated to 200° C., then the maleic anhydride was added. The mixture was stirred under an atmosphere of nitrogen during the entire course of the reaction to avoid undue oxidation by air. Heating and stirring were continued until completion of the reaction, when stirring was stopped, and nitrogen was then bubbled through the mixture until excess maleic anhydride had been driven off, usually in about 20 minutes. The resulting modified wax product was then poured into molds, cooled and tested for ease of emulsification.

*Testing for ease of emulsification*

A standard test formulation was used to determine ease of emulsification, consisting, in parts by weight, of

|  | Parts |
|---|---|
| Modified wax | 40 |
| Oleic acid | 8 |
| Triethanolamine or morpholine | 8 |
| Water | 250 |

Wax and oleic acid were heated to 110° C. and the triethanolamine or morpholine added with stirring. Ten parts of water were then added and the mixture stirred rapidly until a paste formed. The remaining water (heated to boiling) was then added and the emulsion stirred thoroughly until cool. The ease of emulsification of the wax was determined by the appearance and stability of the resulting emulsion graded as follows:

| Appearance | Ease of Emulsification of Wax |
|---|---|
| Translucent—stable | Excellent. |
| Milky—fine particles—stable | Good. |
| Milky—coarse particles—stable | Fair. |
| Milky—separates on standing | Poor. |
| Wax coagulates and floats on surface | Very poor. |

*Penetration test*

Hardness of the modified waxes was determined with a modified Krebs penetrometer by measuring the depth of penetration in 5 seconds of an ASTM needle under a load of 200 grams at room temperature (ca. 22° C.).

The results obtained are shown in Tables 1, 2 and 3 below:

TABLE 1

*Effect of heating time on reaction of ethylene/isopropanol wax with 4% maleic anhydride at 230° C.*

| Example No. | Heating Time (Hours) | Ease of Emulsification | Color |
|---|---|---|---|
| 1 | 0 | Very poor | White. |
| 2 | 0.5 | Fair | Light Yellow. |
| 3 | 0.75 | Good | Light Tan. |
| 4 | 2.00 | ...do... | Brown. |

TABLE 2

*Effect of varying the amount of maleic anhydride heated with ethylene/isopropanol wax for 45 minutes at 230° C.*

| Example No. | Maleic Anhydride, percent | Wax, percent | Unreacted Maleic Anhydride | Ease of Emulsification | Color |
|---|---|---|---|---|---|
| 5 | 0 | 100 | 0 | Very poor | White. |
| 6 | 2 | 98 | 0 | Fair | Light Yellow. |
| 7 | 4 | 96 | trace | Good | Light Tan. |
| 8 | 8 | 92 | ~50%[1] | ...do... | Light Brown. |

[1] Based on amount added to original reaction mixture.

TABLE 3

*Effect of temperature on reaction of ethylene/isopropanol wax heated with 4% by weight maleic anhydride for 40 minutes*

| Example No. | Temp. (° C.) | Ease of Emulsification | Color | Penetration Hardness[1] (mm.) |
|---|---|---|---|---|
| 9 | 150 | Very poor | White | 0.25 |
| 10 | 175 | Poor | Very Slight Tan | 0.25 |
| 11 | 200 | Fair | ...do... | 0.3 |
| 12 | 225 | Good | Slight Tan | 0.3 |
| 13 | 250 | ...do... | Tan | 0.35 |
| 14 | 275 | ...do... | Dark Tan | 0.4 |

[1] Hardness of original sample, 0.25 mm.

EXAMPLES 15–19

In these examples, ethylene/isopropanol waxes of the same character as those used in the foregoing examples were modified by heating at 230° C. with 6% of each of the polybasic acids, maleic, fumaric, itaconic, aconitic and citraconic acids with the results given in Table 4 below.

TABLE 4

*Reaction of ethylene/isopropanol wax with various unsaturated polybasic acids heated with 6% by weight of acid at 230° C.*

| Example No. | Type Acid | Ease of Emulsification | Color |
|---|---|---|---|
| 15 | Maleic | Good | Tan. |
| 16 | Fumaric | ...do... | Do. |
| 17 | Itaconic | ...do... | Do. |
| 18 | Aconitic | ...do... | Dark Tan. |
| 19 | Citraconic | ...do... | Do. |

EXAMPLES 20–26

In these examples 4% of maleic anhydride was reacted with various waxes prepared in the same manner as the ethylene/isopropanol telomer used in the foregoing examples except that the polymerization was carried out in the presence of the indicated telomerizing agent. The reaction time was one hour at 250° C. The preparation of the dehydrated isopropanol telomer was carried out by passing the isopropanol telomer through a column packed with Raschig rings counter current to superheated steam at 200–210° C. for a contact time of 5 minutes. Results are given in Table 5 below.

TABLE 5

*Reaction of maleic anhydride with various ethylene wax telomers heated with 4% anhydride for 1 hour at 250° C.*

| Example No. | Type Telomer | Color of Product | Ease of Emulsification |
|---|---|---|---|
| 20 | Carbon Tetrachloride | Light Tan | Fair. |
| 21 | Ethanol | ...do... | Fair to Good. |
| 22 | Methanol | ...do... | Fair. |
| 23 | Isopropanol | Tan | Good. |
| 24 | Allyl Chloride | Light Tan | Fair. |
| 25 | Ethyl Chloride | ...do... | Do. |
| 26 | Methyl Acetate | Tan | Do. |
| 27 | Dehydrated Isopropanol | ...do... | Excellent. |
| 28 | Tertiary Butyl Alcohol | ...do... | Good. |
| 29 | Octyl Alcohol | ...do... | Do. |

EXAMPLE 30

Maleic anhydride was reacted in the same manner as that described in the foregoing examples with a chlorinated (7% chlorine) ethylene/isopropanol telomer wax. In this test 6 parts of maleic anhydride were heated with 94 parts of wax for one hour at 200° C., and resulted in a dark tan modified wax product having good emulsifiability.

EXAMPLES 31–33

In these examples waxes prepared by copolymerizing ethylene with diethylmaleate, vinyl acetate and vinyl chloride in the presence of isopropanol, and containing about 10% combined ester, and none of which, as originally prepared, were capable of ready emulsification by conventional emulsifying techniques, were heated with 6% maleic anhydride at 210° C. for a period of one hour to produce resulting modified waxes having improved emulsifiability as indicated in Table 6 below.

TABLE 6

*Reaction of copolymers wtih 6% maleic anhydride, heated for 1 hour*

| Example No. | Type Copolymer | Color of Product | Ease of Emulsification |
|---|---|---|---|
| 31 | Ethylene/Diethyl Maleate | Tan | Good. |
| 32 | Ethylene/Vinyl Acetate | ...do... | Do. |
| 33 | Ethylene/Vinyl Chloride | Brown | Fair. |

EXAMPLES 34–36

A series of runs was made in which polyethylene/isopropanol telomer wax prepared as described in Examples 1–14 was treated with maleic anhydride in a continuous manner. These tests were carried out in a stainless steel column of 1-inch internal diameter 5 feet long filled with ¼″ porcelain saddles. In carrying out the tests, the wax was melted, brought to about 120° C. whereupon solid, powdered maleic anhydride was added to the melted wax and the mixtures were pumped through the column at predetermined rates. Mixtures of the wax containing amounts of maleic anhydride varying from 5 to 7.5% in the several runs, were passed downwardly through the column at varying rates and temperatures. Readily emulsifiable waxes were formed when a wax mixture containing at least 5% of maleic anhydride was passed through the column at temperatures varying from 250–300° C. and averaging 275° C. or higher as indicated in the table, in a period of at least 12 minutes.

Results of the series are shown in Table 7 below.

TABLE 7

*Production of emulsifiable wax in 5 ft. column*

| Example No. | Average Column Temp., °C. | Percent Maleic Anhydride By weight | Total Column Contact Time, Minutes | Color of Product | Emulsifiable |
|---|---|---|---|---|---|
| 34 | 275 | 5.0 | 12 | Tan | Yes. |
| 35 | 275 | 7.5 | 12 | do | Do. |
| 36 | 300 | 5.0 | 20 | do | Do. |

Another continuous run, No. 37, was carried out in the apparatus and in a manner similar to that described under Examples 34–36 except that the porcelain saddles were removed and the maleic anhydride—wax mixtures were flowed upwardly through the column. In these tests wax was forced into the bototm of the column and removed from the top. A readily emulsifiable wax was produced by passing a mixture of 6% maleic anhydride and 94% polyethylene/isopropanol telomer wax through the column at a contact time of 40 minutes at temperatures between about 250° C. and about 300° C. averaging 275° C. The final product was tan in color.

EXAMPLE 38

An ethylene-isopropanol wax was reacted with 4% of fumaric acid in the manner described in Examples 1–14, at a temperature between 260 and 265° C. for forty minutes. The resulting modified wax product when tested for ease of emulsification as described, rated "excellent," producing a translucent, almost clear suspension of a dark tan color.

The modified polyethylene waxes of our invention are useful as substitutes for the natural hard waxes such as carnauba wax and the like, in the preparation of aqueous emulsions. One of the more important applications of our modified waxes is as the wax component in aqueous emulsion non-rub polishes, a typical formula of which is given below, in which parts are by weight.

*Non-rub polish*

|   | Parts |
|---|---|
| (a) Modified wax | 40 |
| Stearic acid | 6 |
| Turpentine | 5 |
| (b) Triethanolamine | 4 |
| KOH | 0.5 |
| Water | 0.5 |
| (c) Higher secondary alkyl sodium sulfate (Tergitol 4) | 2 |
| (d) Water | 240 |

The modified waxes of Examples 3, 4, 7, 12, 15, and 16 were incorporated in the above formula, each as the entire wax portion of the formula. The ingredients were blended at 95–100° C. in the order shown in the formula by first mixing wax, stearic acid and turpentine and when thoroughly blended adding the preblended mixture of triethanolamine and potassium hydroxide, and finally adding the higher secondary alkyl sodium sulfate and water. Portions of the polishes so prepared were applied to varnished wooden floor surfaces, and on drying deposited transparent films of a hardness and gloss comparable to those deposited from emulsions otherwise identical but containing carnauba wax. Other portions of the polishes described above were applied to aluminum and steel strips which were then heated to about 150° C. with the result that a clear coating was formed which adhered tenaciously to the metal.

The modified waxes of our invention provide an advantageous additive to latex coating compositions to improve their gloss. For this purpose an emulsion concentrate of the modified wax may conveniently be prepared and added to the latex coating composition in the desired proportion. In general a quantity of modified wax equivalent to about 5% of the vehicle solids increases gloss and water resistance of the coating after application, and may also improve its scuff and soil resistance.

While the above describes the preferred embodiments of our invention, it will be understood that departures may be made therefrom within the scope of the specification and claims.

We claim:

1. A process for preparing readily emulsifiable polyethylene type waxes which comprises reacting a polyethylene wax containing in its structure at least one member of a group consisting of a telomeric alcohol group, an ester group, a hologen group, and a terminal vinyl group, with at least about 2% by weight, based on the weight of the mixture, of an unsaturated aliphatic polycarboxylic acid having from 4 to 6 carbon atoms inclusive at least one of whose active carbonyl groups is attached to a doubly bound carbon, at temperatures between about 175° C. and about 300° C.

2. The process according to claim 1, wherein the unsaturated acid is maleic acid.

3. The process according to claim 2, wherein the quantity of maleic acid used is between about 3% and about 6% and the reaction temperature is between about 190° C. and about 250° C.

4. The process according to claim 1, wherein the polyethylene wax has a molecular weight not greater than 6,000.

5. The process according to claim 1, wherein the polyethylene wax is a polyethylene/isopropanol telomer.

6. The process according to claim 5 in which the polyethylene/isopropanol telomer contains a double bond resulting from dehydration of the alcohol group.

7. The process according to claim 1, wherein the unsaturated acid is fumaric acid, the quantity of unsaturated acid is between about 3% and about 6% and the reaction temperature is between about 250° C. and about 275° C.

8. A process for improving the emulsifiability of polyethylene type waxes which comprises reacting a polyethylene/isopropanol telomer having a molecular weight in the range between about 1,000 and about 3,000 with between about 3% and about 4% by weight, based on the weight of the mixture, of maleic acid at temperatures between about 190° C. and about 250° C. for a period between about 30 minutes and about 120 minutes.

9. A continuous process for treating a polyethylene type wax to improve its emulsifiability in aqueous media which comprises passing a mixture of an ethylene/isopropanol telomer wax and at least about 2% of maleic anhydride through a heated reaction zone at temperatures between about 250° C. and about 300° C.

10. A readily emulifiable polyethylene type wax comprising the reaction product of a waxy ethylene polymer containing in its structure at least one member of a group consisting of a telomeric alcohol group, an ester group, a halogen group, and a terminal vinyl group, and an unsaturated aliphatic polycarboxylic acid having from 4 to 6 carbon atoms inclusive, and having at least one active carbonyl group attached to a doubly bound carbon.

11. The composition according to claim 10 wherein the waxy ethylene polymer is a polyethylene/isopropanol telomer.

12. The composition according to claim 10 wherein the unsaturated acid is maleic acid.

13. A readily emulsifiable polyethylene type wax comprising the reaction product of a polyethylene/isopropanol telomer and maleic anhydride.

14. A readily emulsifiable polyethylene type wax comprising the reaction product of a polyethylene/isopropanol telomer and fumaric acid.

15. An aqueous emulsion comprising the reaction product of a waxy ethylene polymer containing in its structure at least one member of a group consisting of a telomeric alcohol group, an ester group, a halogen group, and a terminal vinyl group, and an unsaturated aliphatic polycarboxylic acid having from 4 to 6 carbon atoms inclusive and having at least one active carbonyl group attached to a doubly bound carbon, an emulsifying agent and water.

16. The composition according to claim 15 wherein the waxy ethylene polymer is a polyethylene/isopropanol telomer.

17. The composition according to claim 15, wherein the unsaturated acid is maleic acid.

18. The composition according to claim 15, wherein the unsaturated acid is fumaric acid.

19. An aqueous emulsion comprising the reaction product of a polyethylene/isopropanol telomer and maleic anhydride, an emulsifying agent and water.

20. A process for preparing readily emulsifiable polyethylene type waxes which comprises reacting a polyethylene wax containing in its structure at least one member of the group consisting of a telomeric alcohol group, an ester group, a halogen group and a terminal vinyl group, with at least about 2% by weight, based on the weight of the mixture, of an unsaturated aliphatic polycarboxylic acid having from 4 to 6 carbon atoms inclusive, at least one of whose active carbonyl groups is attached to a doubly bound carbon, at temperatures between about 175° C. and about 300° C., and for a time sufficient to produce a wax having an ester number of substantially zero.

References Cited in the file of this patent

UNITED STATES PATENTS

| | | |
|---|---|---|
| 2,504,400 | Erchak | Apr. 18, 1950 |
| 2,507,568 | Hanford | May 16, 1950 |
| 2,560,588 | Munday | July 17, 1951 |
| 2,634,256 | Sparks | Apr. 7, 1953 |